United States Patent
Kolesnik et al.

(10) Patent No.: US 6,249,614 B1
(45) Date of Patent: Jun. 19, 2001

(54) VIDEO COMPRESSION AND DECOMPRESSION USING DYNAMIC QUANTIZATION AND/OR ENCODING

(75) Inventors: Victor D. Kolesnik; Irina E. Bocharova; Boris D. Kudryashov; Andrey Malkov; Andrey Marsavin; Victor Simileysky; Felix A. Taubin, all of St. Petersburg (RU)

(73) Assignees: Alaris, Inc., Freemont; G. T. Technology, Inc., Saratoga, both of CA (US)

( * ) Notice: Subject to any disclaimer, the term of this patent is extended or adjusted under 35 U.S.C. 154(b) by 0 days.

(21) Appl. No.: 09/036,883

(22) Filed: Mar. 6, 1998

(51) Int. Cl.[7] ..................................................... G06K 9/36
(52) U.S. Cl. .......................... 382/251; 382/240; 382/246; 382/239; 375/240.11; 375/240.19
(58) Field of Search ..................................... 382/251, 239, 382/238, 236, 240, 44–45, 232, 250, 248, 246; 348/405; 375/240.03, 240.11, 240.19, 240.23, 240.12, 240.22, 240.16, 240.25, 240.2, 240.24, 240.04; 341/50–51, 67, 65, 61; 358/433, 432, 402, 426

(56) References Cited

U.S. PATENT DOCUMENTS

| | | | | |
|---|---|---|---|---|
| 5,073,820 | * | 12/1991 | Nakagawa | 375/240.03 |
| 5,157,488 | * | 10/1992 | Pennebaker | 375/240.04 |
| 5,315,670 | | 5/1994 | Shapiro | 382/56 |
| 5,410,352 | * | 4/1995 | Watanabe | 375/240.03 |
| 5,412,741 | | 5/1995 | Shapiro | 382/232 |
| 5,420,636 | * | 5/1995 | Kojima | 348/403.1 |
| 5,473,376 | * | 12/1995 | Auyeung | 375/403.1 |
| 5,489,944 | * | 2/1996 | Jo | 375/240.03 |
| 5,491,761 | * | 2/1996 | Kim | 382/251 |
| 5,517,327 | * | 5/1996 | Nakatani | 358/462 |
| 5,602,589 | | 2/1997 | Vishwanath et al. | 348/398 |
| 5,638,068 | | 6/1997 | Nickerson | 341/67 |
| 5,682,152 | * | 10/1997 | Wang et al. | 341/50 |
| 5,686,964 | * | 11/1997 | Tabatabai | 375/240.24 |
| 6,049,630 | * | 4/2000 | Wang et al. | 382/239 |

* cited by examiner

Primary Examiner—Leo Boudreau
Assistant Examiner—Ishrat Sherali
(74) Attorney, Agent, or Firm—Blakely Sokoloff Taylor & Zafman

(57) ABSTRACT

A method and apparatus for performing video compression and decompression using dynamic quantization and/or encoding. According to one aspect of the compression method, an image is recursively filtered into its constituent components each represented by a matrix of coefficients. Next, the level of correlation of a first of the matrices of coefficients is determined. Based on the level of correlation of this first coefficient matrix, one of a first quantization technique and a second quantization technique is selected. The first coefficient matrix is then quantized using the selected quantization technique.

According to another aspect of the compression method, an image is digitally filtered into its constituent components, each represented by a matrix of coefficients. At least certain matrices are quantized to generated a first quantized matrix. The first quantized matrix is then recursively divided until the first quantized matrix or each of the resulting submatrices is sufficiently dense or sufficiently sparse. Each of the sufficiently dense matrices are encoded using a first technique, while each of the sufficiently sparse matrices are encoded a second technique.

24 Claims, 14 Drawing Sheets

PRESCRIBED VALUES

VIDEO COMPRESSION AND DECOMPRESSION USING DYNAMIC QUANTIZATION AND/OR ENCODING

CROSS-REFERENCE TO RELATED APPLICATIONS

Not Applicable.

BACKGROUND OF THE INVENTION

1. Field of the Invention

The invention relates to the field of image data compression and decompression.

2. Background Information

Computer systems display both still and motion video images. Motion video usually consists of a sequence of images (referred to as frames) that, when displayed at a particular frame rate, will appear as "real-time" motion to a human eye. A still video image or a frame in a motion video sequence comprises a number of elements referred to as pixels (e.g., a 640×480 image comprises over 300,000 pixels). Each pixel is represented by a binary pattern that describes that pixel's characteristics (e.g., color, brightness, etc.). Given the number of pixels in a typical video image, storing and/or transmitting uncompressed still or motion video data requires a relatively large amount of computer storage space and/or bandwidth. Additionally, in several motion video applications, processing and displaying a sequence of frames must be performed fast enough to provide real-time motion (typically, between 15–30 frames per second). Techniques have been developed to compress the amount of data required to represent still and motion video, making it possible for more computing systems to process still and motion video.

One such compression technique is based on decomposing a frame into its different components using a digital filter, and then encoding each component using the coding technique best suited to that component's characteristics. To provide an example, subband coding in a technique by which each frame is decomposed into a number of frequency subbands, which are then encoded using the coding technique best suited to that subband's characteristics. As another example, various references describe different frame compression systems that are based on using wavelets to decompose a frame into its constituent components (e.g., U.S. Pat. No. 5,661,822; U.S. Pat. No. 5,600,373). For example, a frame compression system can decompose an image into a high frequency subband (H) and a low frequency subband (L), and then further decompose the H and L subbands to generate a high-high frequency part (HH), a high-low frequency part (HL), a low-high frequency part (LH), and a low-low frequency part (LL). Generally, the LL subband contains most of the signal energy, while the HH subband represents a relatively small percentage of the energy.

The results of the decomposition are typically quantized and encoded. While certain techniques have been described for quantizing and encoding the result of decomposed image data (U.S. Pat. No. 5,135,670; U.S. Pat. No. 5,412,741), lower processing complexity, higher quality, and/or higher compression ratio techniques are desired and/or required.

BRIEF SUMMARY OF THE INVENTION

A method and apparatus for performing video compression and decompression using dynamic quantization and/or encoding is described. According to one aspect of the compression method, an image is recursively filtered into its constituent components each represented by a matrix of coefficients. Next, the level of correlation of a first of the matrices of coefficients is determined. Based on the level of correlation of this first coefficient matrix, one of a first quantization technique and a second quantization technique is selected. The first coefficient matrix is then quantized using the selected quantization technique.

According to another aspect of the compression method, an image is digitally filtered into its constituent components, each represented by a matrix of coefficients. At least certain matrices are quantized to generated a first quantized matrix. The first quantized matrix is then recursively divided until the first quantized matrix or each of the resulting submatrices is sufficiently dense or sufficiently sparse. Each of the sufficiently dense matrices are encoded using a first technique, while each of the sufficiently sparse matrices are encoded a second technique.

BRIEF DESCRIPTION OF THE DRAWINGS

The invention may best be understood by referring to the following description and accompanying drawings which are used to illustrate embodiments of the invention. In the drawings.

DETAILED DESCRIPTION OF THE INVENTION

A method and apparatus for performing video compression and decompression using dynamic quantization and/or encoding is described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

COMPRESSION

Overview of Compression

Figure 1:
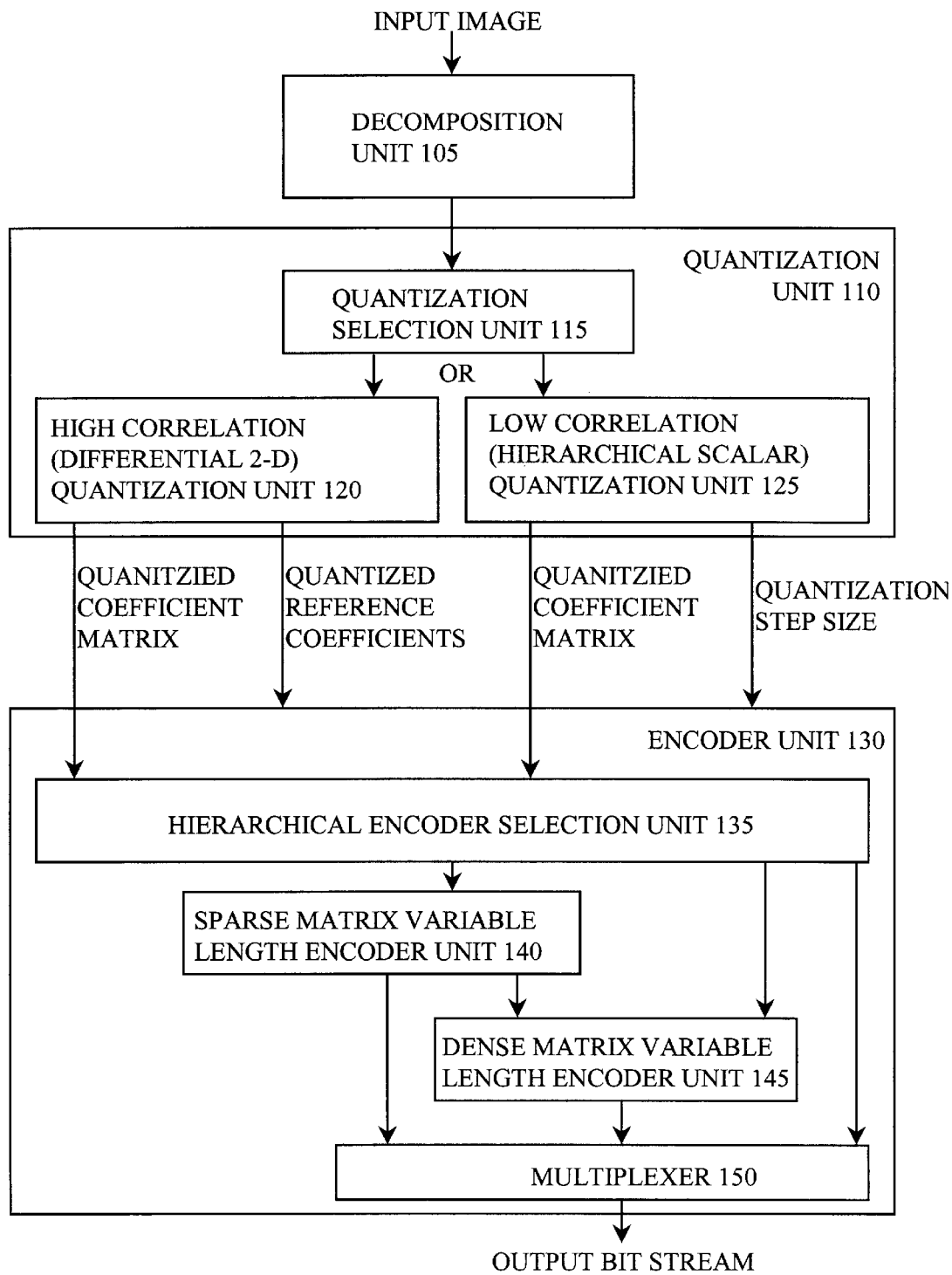
FIG. 1 is a conceptual data flow diagram illustrating a video compression technique according to one embodiment of the invention.

FIG. 1 is a conceptual data flow diagram illustrating a video compression technique according to one embodiment of the invention. FIG. 1 illustrates video data being input into a decomposition unit 105. The image represented by the video data being input into the decomposition unit 105 can have any number of forms, including a single still video image, multiple still video images, a frame of a motion video sequence, multiple frames of a motion video sequence, etc. The decomposition unit 105 decomposes the image represented by the input video data into its different constituent frequency components using digital filter(s). While any number of different digital filters may be implemented by the decompression unit 105, one embodiment of the invention further described herein (specifically with reference to FIG. 2) uses wavelets to decompose the input video data into different frequency subbands. Each of these subbands is represented by a matrix of wavelet coefficients. The decomposition unit 105 provides these coefficient matrices to a quantization unit 110.

In one embodiment of the invention, the quantization unit 110 includes a quantization selection unit 115 that dynamically selects, for at least certain of the coefficient matrices, the quantization technique to be used. While any number of different techniques may be used for selecting different quantization techniques for different matrices, in one embodiment of the invention that is further described herein the quantization selection unit 115 selects the quantization technique for a given matrix based on the level of correlation of that matrix. In particular, FIG. 1 illustrates that the quantization selection unit 115 selects either a high correlation quantization unit 120 or a low correlation quantization unit 125. Furthermore, while any number of different quantizers may be used for the highly correlated matrices and the low correlated matrices, in one embodiment of the invention illustrated in FIG. 1 the highly correlated and low correlated matrices are respectively quantized using a differential 2-D quantizer and a hierarchical scalar quantizer. Examples of the differential 2-D quantizer and the hierarchical scalar quantizer are further described later herein. Thus, one aspect of the invention is the dynamic selection of different quantizers for at least certain of the different matrices of coefficients generated in response to decomposing input video, while another aspect of the invention is the implementation of the quantizer(s).

Following the quantization process, the resulting data is then encoded. In the embodiment of the invention illustrated in FIG. 1, the resulting quantized coefficient matrices are provided to an encoder unit 130. In one embodiment of the invention, the encoded unit 130 is implemented to dynamically select between various encoding techniques for at least some of the quantized coefficient matrices. For example, the encoded unit 130 illustrated in FIG. 1 includes a hierarchical encoder selection unit 135 which receives the quantized matrix coefficients. As further described later herein, certain embodiments of the hierarchical encoder selection unit 135 recursively divide the quantized coefficient matrices until sub-matrices are reached that can be efficiently encoded using one of the various encoding techniques supported. For example, the exemplary implementation of the encoder unit 130 shown in FIG. 1 supports a sparse matrix variable length encoder unit 140 and a dense matrix variable length encoder unit 145, as well as the ability to encode matrices as zero matrices. Thus, one aspect of the invention is the dynamic selection of encoding techniques for at least certain matrices and/or submatrices, while another aspect of the invention is the different implementations of the encoder(s).

The encoded video data is then supplied to a multiplexer 150 to form an output bit stream of compressed video data for transmission and/or storage. While various ones of the units illustrate in FIG. 1 will be described with reference to a software or hardware implementation, each of the units illustrated in FIG. 1 can be implemented using hardware, firmware, and/or software. By way of example, various systems for implementing the invention are later described herein with reference to FIG. 13.

Decomposition

As previously stated, one embodiment of the decomposition unit 105 implements wavelet based digital filtering to decompose the input video data into different matrices of coefficients, where each of the coefficient matrices represents a frequency subband. For example, in one embodiment of the invention, the input video data is decomposed into a high frequency subband (H) and a low frequency subband (L), and then further decomposes the H and L subbands to generate a high horizontal-high vertical frequency subband (HH), a high horizontal-low vertical frequency subband (HL), a low horizontal-high vertical frequency subband (LH), and a low horizontal-low vertical frequency subband (LL). In one embodiment, decompositions are performed using two times subsampling such that an input image of size M×N pixels is decomposed into four matrices of coefficients, where each matrix is of size M/2×N/2. While one embodiment is described in which the input video image is decomposed into four subbands, alternative embodiments can decompose the input video data more, less, and/or different ways. For example, alternative embodiments can further decompose the LL subband, but not further decompose the other subbands.

While any number of different wavelets can be used, certain exemplary wavelets for the decomposition unit 105 are found in Wickerhauser, Miaden Victor, *Adapted Wavelet Analysis for Theory to Software*, A.K. Peters Ltd., Wellesley, Mass. 1994, pp. 443–462.

Figure 2A:
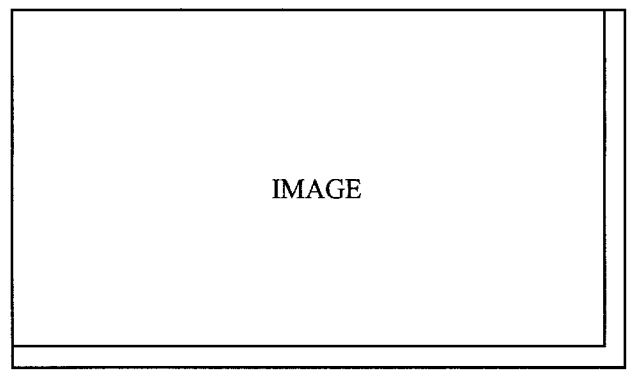
FIG. 2A is part of a series of block diagrams illustrating the process by which decomposition is performed using an in-place buffer according to one embodiment of the invention.
Figure 2B:
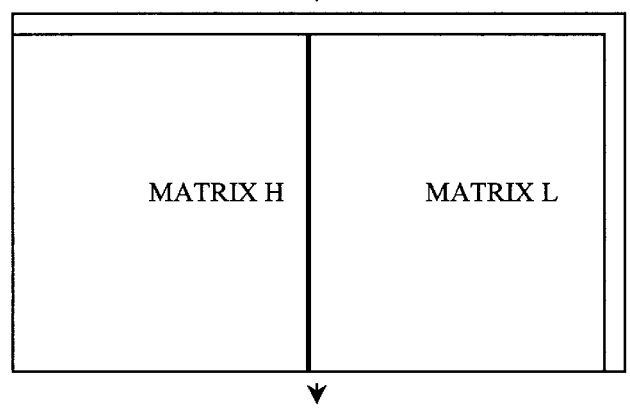
FIG. 2B is part of a series of block diagrams illustrating the process by which decomposition is performed using an in-place buffer according to one embodiment of the invention.
Figure 2C:
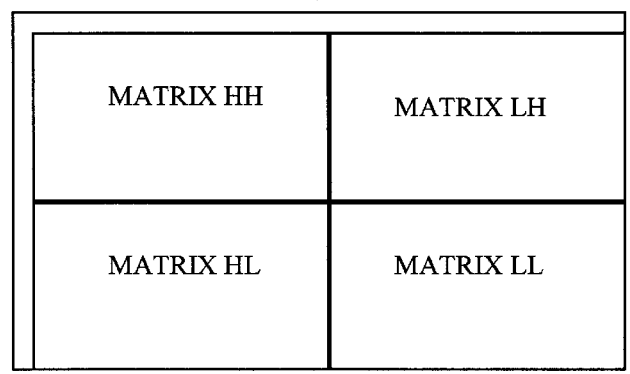
FIG. 2C is part of a series of block diagrams illustrating the process by which decomposition is performed using an in-place buffer according to one embodiment of the invention.
Figure 2D:
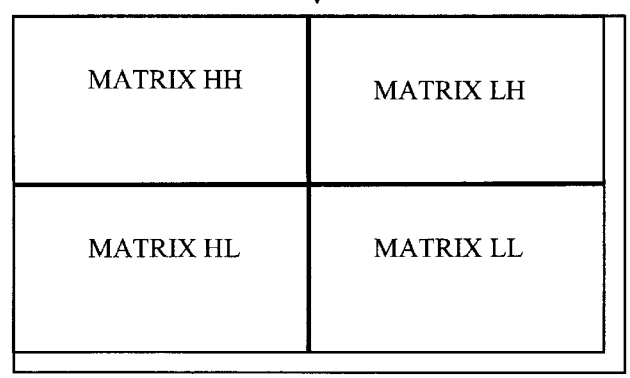
FIG. 2D is part of a series of block diagrams illustrating the process by which decomposition is performed using an in-place buffer according to one embodiment of the invention.

In one embodiment of the invention, the decomposing of the input video is performed using an "in-place" buffer having one additional row and column than is required to store the input image. By way of example, FIGS. 2A–D are a series of block diagrams illustrating the process by which the decomposition is performed using an in-place buffer according to one embodiment of the invention. The additional row(s) and column(s) are used to store the results of the digital filter such that the pixels of the original image are not overwritten until they are no longer needed. In operation, the original image is stored starting at the upper left-hand corner of the buffer such that there are one or more unused rows and columns respectively along the right and bottom sides of the buffer (FIG. 2A). Then, the results of the first pass of the digital filter (in this example horizontal) are stored starting at the lower left-hand corner of the buffer (FIG. 2B). Similarly, the results of the second pass of the digital filter (in this example vertical) are stored starting at the lower right-hand corner of the buffer (FIG. 2C). While FIGS. 2A–C illustrate two passes of the digital filter are performed on all of the input video data, alternative embodiments can decompose the entire image or only parts of the image more or less times. For example, one embodiment in which only the matrix LL is further filtered, the matrices are shifted up and left so the matrices are stored starting at the upper right-hand corner of the buffer (FIG. 2D); This allows the matrix LL to be further filtered in the same manner as the original image using the in-place buffer without modifying the other matrices. While one embodiment of performing decomposition using an in-place buffer has been described with reference to a specific technique for placing the data in that buffer, alternative embodiments could place the data in the in-place buffer in any number of different ways.

To provide a more efficient software implementation of the decomposition unit 105, it is advantageous to account for the computer memory architecture used in conjunction with modern processors (for example, the Pentium® processor manufactured by Intel Corporation of Santa Clara, Calif.). Typical modern processors include one or more levels of cache on-chip, where one or all of these levels include separate caches for data and instructions. These caches are used to raise system performance and are fully transparent to application software.

A typical cache stores a total L bytes of data in elements referred to a lines, where each line contains l bytes. Typically, cache lines can only be mapped to l-byte aligned blocks of main memory. Since caches do not support partially-filled cache lines, caching even a single double word requires storing an entire line in the cache. Knowledge of cache dimensions and replacement algorithms are an indication of how large of a data structure can be operated on at once without causing cache thrashing.

In one embodiment of the invention, the horizontal digital filtering is performed by blocks (rows) of length l-bytes; In other words, the block(row) size is matched to the data cache line size. By implementing the horizontal wavelet filtering to operate on blocks (rows) of length l-bytes, the problems related to cache thrashing are avoided.

Unlike horizontal digital filtering, vertical (column) digital filtering requires the processor to read column elements which do not represent aligned blocks of main memory. Since the column elements are unaligned blocks of memory, an entire cache line must typically be loaded for each column element. Since a column element is typically only part of the information stored in a cache line, processing time is wasted loading that part of the cache line that does not contain the column element. However, the loss of time related to loading cache lines for vertical digital filtering can be avoided by processing l columns simultaneously.

Although processing l columns simultaneously avoids the loss of time related to loading cache lines, reducing the processing time expenditures required for the write operations should also be considered. In particular, the processing time required for the write operations can be reduced by further increasing the number of columns simultaneously processed. For example, in one embodiment of the invention the vertical filtering results are shifted (e.g., by one; FIGS. 2B and 2C). Since the results are shifted by one row, loading B columns to the cache followed by shifting them is equivalent to loading B+1 columns. As a result, 1–α unused cache elements are loaded, where α=B+1–⌈B/l⌉l and ⌈·⌉ denotes the entire part of the enclosed number. Based on this equation, increasing B results in: 1) a reduction in the fraction of unused cache elements reloaded at each step of vertical filtering; and 2) an increase in the system complexity. Unfortunately, increasing the system complexity also leads to a loss of processing time.

Thus the value of simultaneously processed columns B is a function $f(M, N, l, L_o)$, where M×N is an image size, l denotes the cache line size in bytes, and $L_o$ is a wavelet filter length. Based on this function, increasing B leads to increasing system complexity, while decreasing B increases loss of time for cache addressing. Accordingly, for the given parameters M, N, l, $L_o$ there exists the optimal value of B.

Figure 3A:
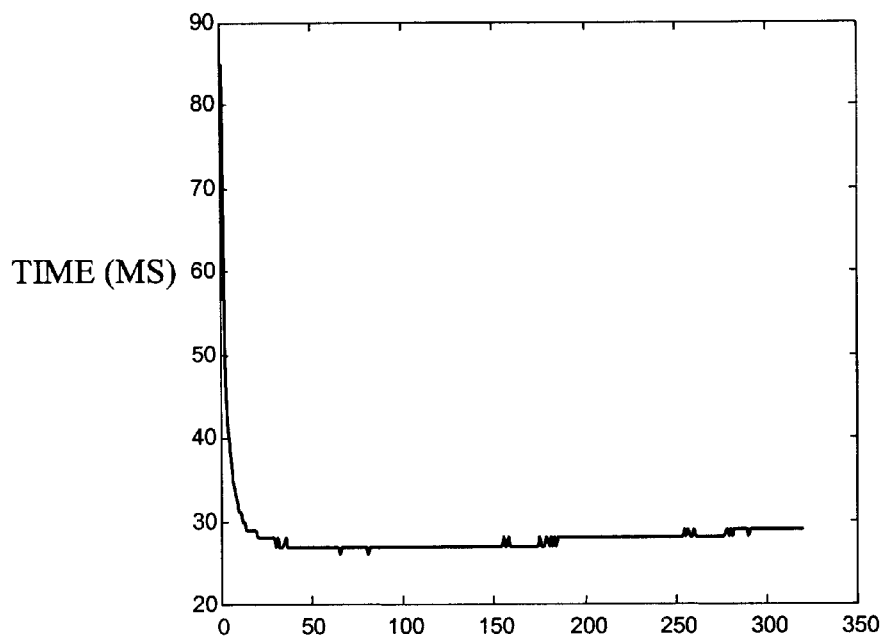
FIG. 3A is a graph illustrating the typical behavior of time expenditures for the vertical filtering of image size 240×320 using a wavelet filter of length 9 according to one embodiment of the invention.
Figure 3B:
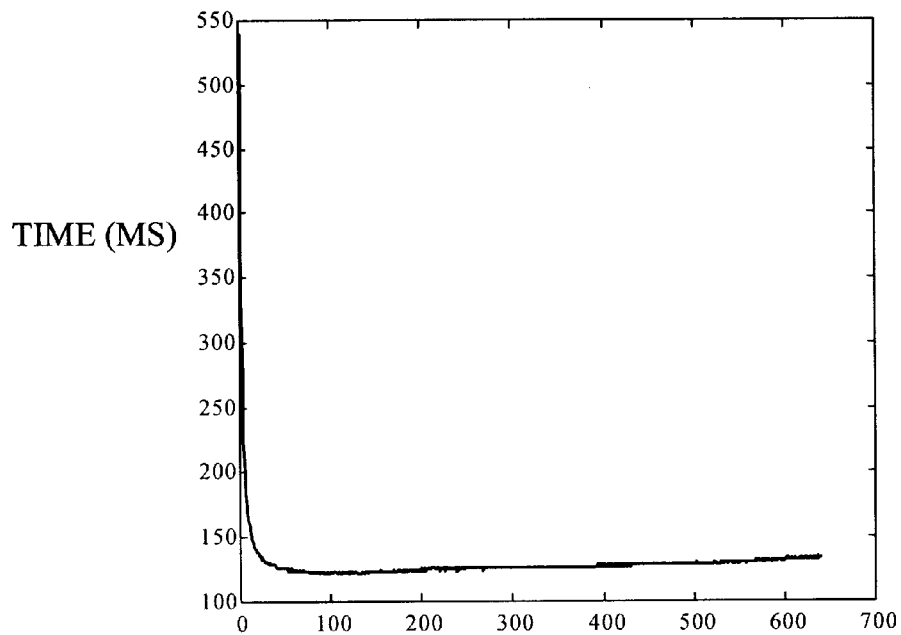
FIG. 3B is a graph illustrating the typical behavior of time expenditures for the vertical filtering of image size 480×640 pixels using a wavelet filter of length 9 according to one embodiment of the invention.

FIGS. 3A and 3B are graphs respectively illustrating the typical behavior of time expenditures for the vertical filtering of image sizes 240×320 and 480×640 pixels using a wavelet filter of length 9 according to one embodiment of the invention. The vertical and horizontal axies in both graphs are respectively time in milli-seconds and the number of simultaneously processed pixels. In one embodiment of the invention, decomposition of the input image is performed using blocks of size l×B pixels, where parameter is matched to the cache line size and parameter B is optimized.

While one embodiment is described in which an in-place buffer is used, alternative embodiments could use other buffer techniques (e.g., multiple buffers by storing the output of the digital filter being performed on the contents of one buffer into a different buffer).

Quantization and Encoding

Figure 4:
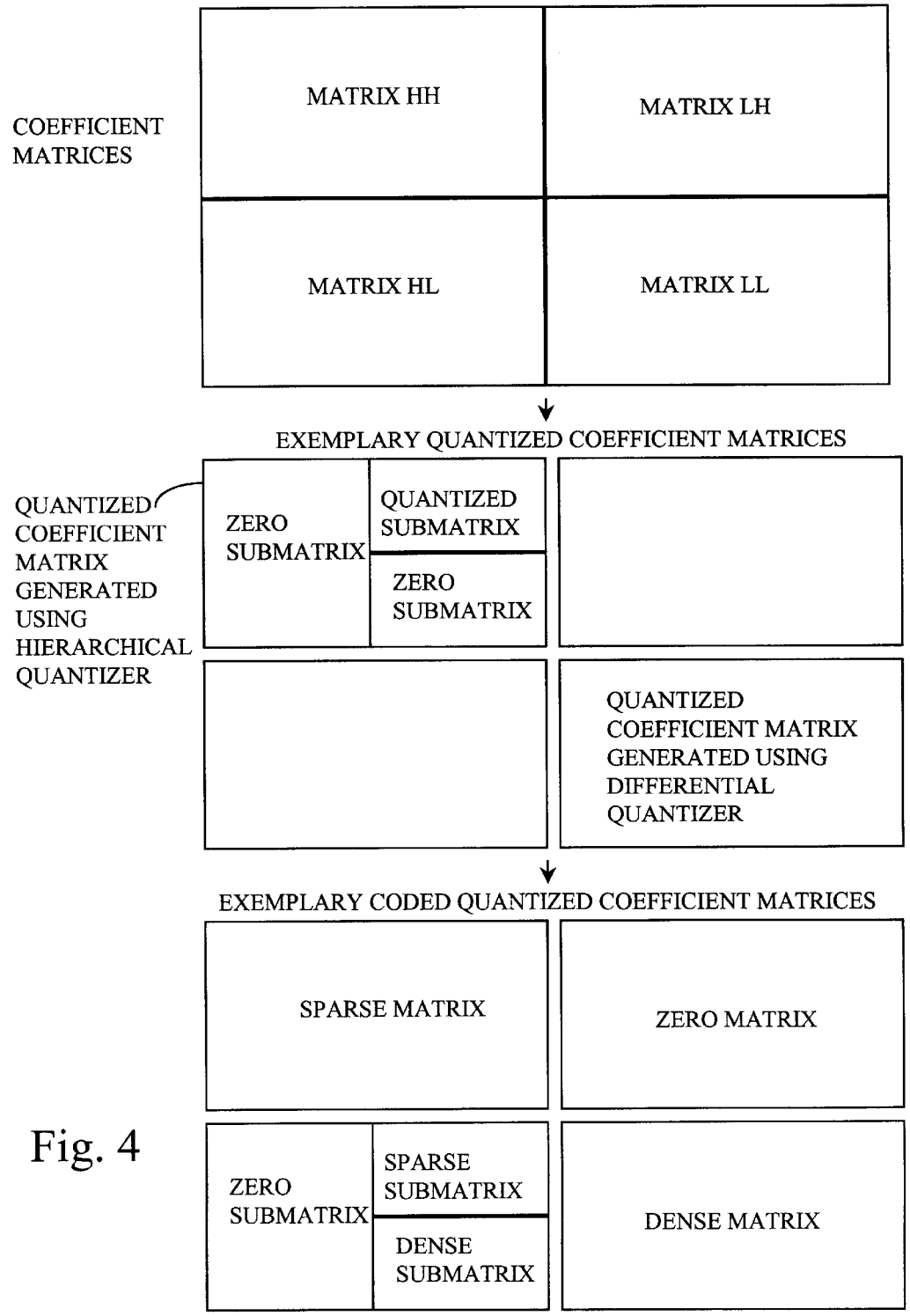
FIG. 4 is a conceptual block diagram illustrating an exemplary quantization and encoding of an input video image using the compression system illustrated in FIG. 1 according to one embodiment of the invention.

FIG. 4 is a conceptual block diagram illustrating an exemplary quantization and encoding of an input video image using the compression system illustrated in FIG. 1 according to one embodiment of the invention. FIG. 4 will be referred to during the following description of the quantization and encoding techniques to ease the understanding of the different aspects of the invention. Thus, the invention is not limited to the exemplary processing illustrated in FIG. 4. For example, while FIG. 4 illustrates that certain quantization and encoding techniques illustrated in FIG. 1 are used to process the input video data, alternative embodiments of the invention could simply use one or the other of the quantization and/or encoding techniques.

Quantization Selection

Figure 5:
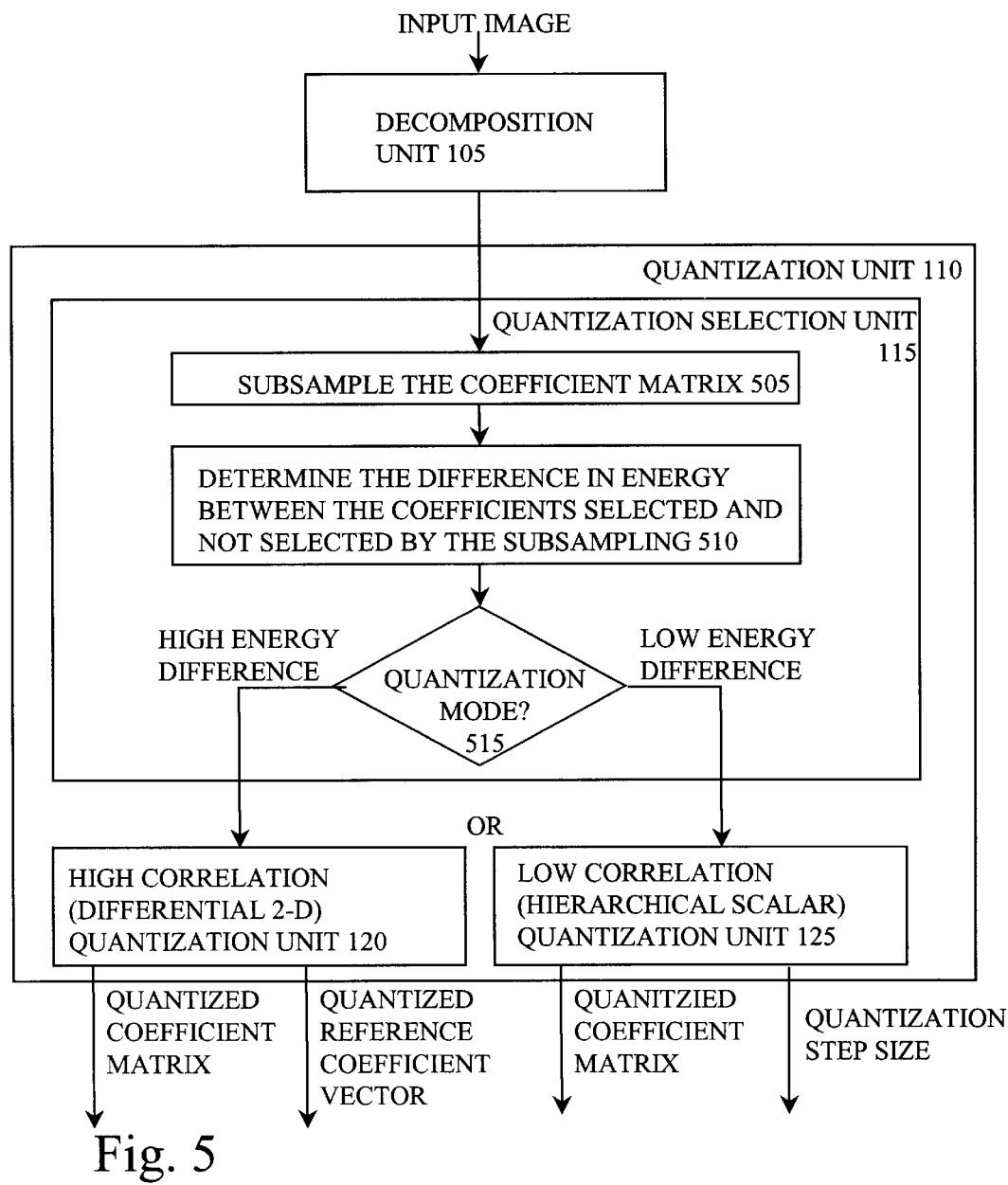
FIG. 5 is a block diagram illustrating additional detail concerning the quantization selection unit of FIG. 1 according to one embodiment of the invention.

FIG. 5 is a block diagram illustrating additional detail concerning the quantization selection unit of FIG. 1 according to one embodiment of the invention. As previously described, the quantization selection unit 115 dynamically selects, at least for certain of the coefficient matrices, the quantizer to be used. The criteria used by quantization selection unit 115 to select the type of quantizer to be used is going to be governed by the types of quantizers supported, the performance required, the quality required, etc. While any number of different criteria can be used, one embodiment of the quantization selection unit 115 described herein uses the level of correlation between the matrix coefficients to select the appropriate quantizer.

Although a number of different techniques can be used for determining the level of correlation between the matrix coefficients, one embodiment of the invention determines the level of correlation by first subsampling the coefficient matrix (block 505). In particular, one embodiment of the invention four times subsamples the coefficient matrices provided by the decomposition unit 105. As a result of this subsampling, two sets of coefficients are formed: 1) the first set of coefficients is composed of those selected during the subsampling (referred to as the subsampled matrix); and 2) the second set of coefficients contains those coefficients which were not selected during the subsampling. Then the difference between these two matrices is formed and its energy calculated. By way of example, one embodiment of the invention uses a decimator to four times subsample the input coefficient matrix $$W=\{w_{i,j},\ i=1\ \ldots\ M, j=1\ \ldots\ N\}$$

and generates a first set of coefficients $$W_s=\{w_{si,j}=w_{k,l},\ i=1\ \ldots\ M/2, j=1\ \ldots\ N/2, k=2,4\ \ldots\ M, l=2,4,\ \ldots\ N\}$$

(where M and N are soon to be even) and a second set of coefficients $$W_n=\{w_{si,j}=w_{k,l}, i=1\ \ldots\ M/2, j=1\ \ldots\ N/2, k=1,3\ \ldots\ M-1, l=1,4\ \ldots\ N-1\}.$$

The difference in energy between the subsampled matrix ($W_s$) and the $W_n$ matrix is then determined (block 510); $W_d=W_s-W_n$. In particular, one embodiment of the invention computes the difference in energy using the following equation:

$$E = \sum_{i=1}^{M/2} \sum_{j=1}^{N/2} w_{di,j}^2.$$

Based on the difference in the energy between the subsampled matrix and the difference matrix, one of the quantizers is selected (block 515). For example, in the embodiment illustrated in FIG. 5, if the difference in energy is high (greater than a predetermined threshold) then the originally input coefficient matrix is identified as a highly correlated matrix and the high correlation quantization unit 120 is invoked. Otherwise, the original matrix is identified as having a low level of correlation and the low correlation quantization unit 125 is invoked. To distinguish between matrices identified as highly correlated and low correlated, one embodiment of the invention inserts a zero or a one in the bit stream. Of course, alternative embodiments could use other means for indicating which quantization mode was selected.

With reference to FIG. 4, the coefficient matrices generated by the decomposition unit are shown followed by exemplary quantized coefficient matrices. As illustrated in FIG. 4, different quantization techniques were selected for different ones of the LH and LL subbands. While in one embodiment the quantization technique to be used is dynamically selected for each matrices, alternative embodiments of the invention could always use the same quantizers for some or all of the subbands. For example, one embodiment of the invention dynamically selects the quantization technique to be used on the HH and HL subbands, but uses a predetermined quantization technique for the LH and LL subbands. In particular, one such embodiment always treats the LH subband as a matrix with low correlation, while always treating the LL subband as a highly correlated matrix. In embodiments of the invention in which predetermined quantizers are used for some or all of the coefficient matrices, an indication of which quantizer was used may not be inserted in the bit stream.

Highly Correlated Matrix Quantization

Figure 6A:
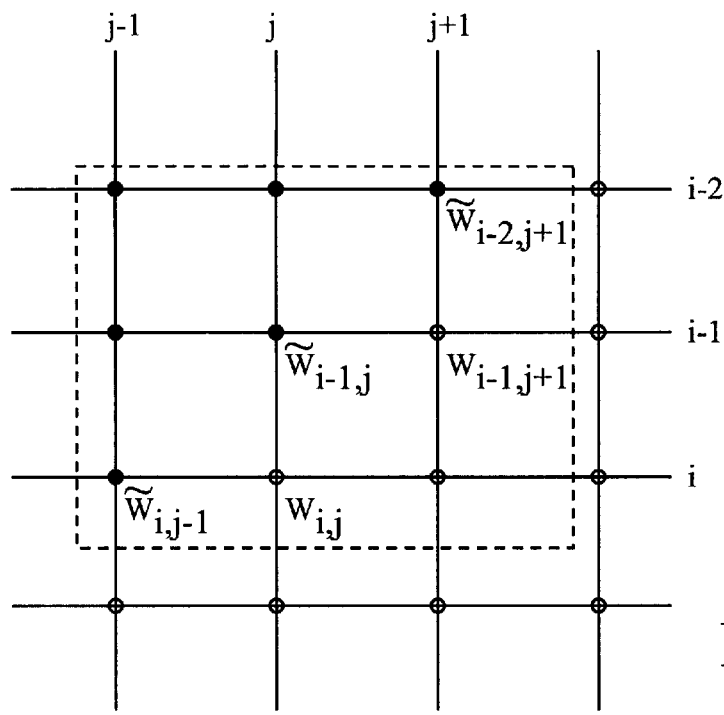
FIG. 6A is a diagram illustrating a differential 2-D quantizer according to one embodiment of the invention.

While any number of different quantizers can be used for the high correlation quantization unit 120, one embodiment of the invention uses a differential 2-D quantizer. FIG. 6A is a diagram illustrating the differential 2-D quantizer according to one embodiment of the invention. To describe the differential 2-D quantizer, let $W=\{w_{i,j}, i=1, \ldots M, j=1, \ldots N\}$ be the matrix of coefficients (e.g., the matrix of coefficients for the LL subband) that is transformed into the quantized coefficient matrix $\tilde{W}=\{\tilde{w}_{i,j}, i=1, \ldots M, j=1, \ldots N\}$. At each step of the quantization procedure two entries $W_{i,j}, W_{i-1,j+1}$ inside a square are considered, where the square is slide from left to right across the matrix. The differential 2-D quantizer predicts the sum $w_{i,j}+w_{i-1,j+1}$ and the difference $w_{i,j}-w_{i-1,j+1}$ representing them as linear combinations of previously estimated values $\tilde{w}_{i,j-1}, \tilde{w}_{i-1,j}, \tilde{w}_{i-2,j+1}, \tilde{w}_{i-1,j}+(\tilde{w}_{i,j-1}+\tilde{w}_{i-2,j+1})/2$ and $(\tilde{w}_{i,j-1}-\tilde{w}_{i-2,j+1})/2$. Furthermore the differential 2-D quantizer generates the quantized estimation errors $E_{i,1}, E_{i,2}$ which are calculated as follows $$E_{i,1}=\text{quant}(w_{i,j}+w_{i-1,j+1}-\tilde{w}_{i-1,j}-\tilde{w}_{i,j-1}/2-\tilde{w}_{i-2,j+1}/2),$$

$$E_{i,2}=\text{quant}(w_{i,j}-w_{i-1,j+1}-\tilde{w}_{i,j-1}/2+\tilde{w}_{i-2,j+1}/2),$$

where $\text{quant}(w)=q(w)\delta$, $\delta$ denotes the quantization step, and $q(w)=\lfloor w/\delta \rfloor$, $\lfloor . \rfloor$ means an integer nearest to $w/\delta$. The quantized values of these estimation errors $$q(E_{i,1})=q(w_{i,j}+w_{i-1,j+1}-\tilde{w}_{i-1,j}-\tilde{w}_{i,j-1}/2-\tilde{w}_{i-2,j+1}/2),$$

$$q(E_{i,2})=q(w_{i,j}-w_{i-1,j+1}-\tilde{w}_{i,j-1}/2+\tilde{w}_{i-2,j+1}/2),$$

are transmitted into the bit stream and requantized values $E_{i,1}, E_{i,2}$ are used for getting estimates $\tilde{w}_{i,j}, \tilde{w}_{i-1,j+1}$ for the values $w_{i,j}, w_{i-1,j+1}$ by the formulas $$T_{i,1}=\tilde{w}_{i-1,j}+(\tilde{w}_{i,j-1}+\tilde{w}_{i-2,j+1})/2+E_{i,1};$$

$$T_{i,2}=(\tilde{w}_{i,j-1}-\tilde{w}_{i-2,j+1})/2+E_{i,2};$$

$$\tilde{w}_{i,j}=(T_{i,1}+T_{i,2})/2;$$

and $$\tilde{w}_{i-1,j+1}=(T_{i,1}-T_{i,2})/2$$

Figure 6B:
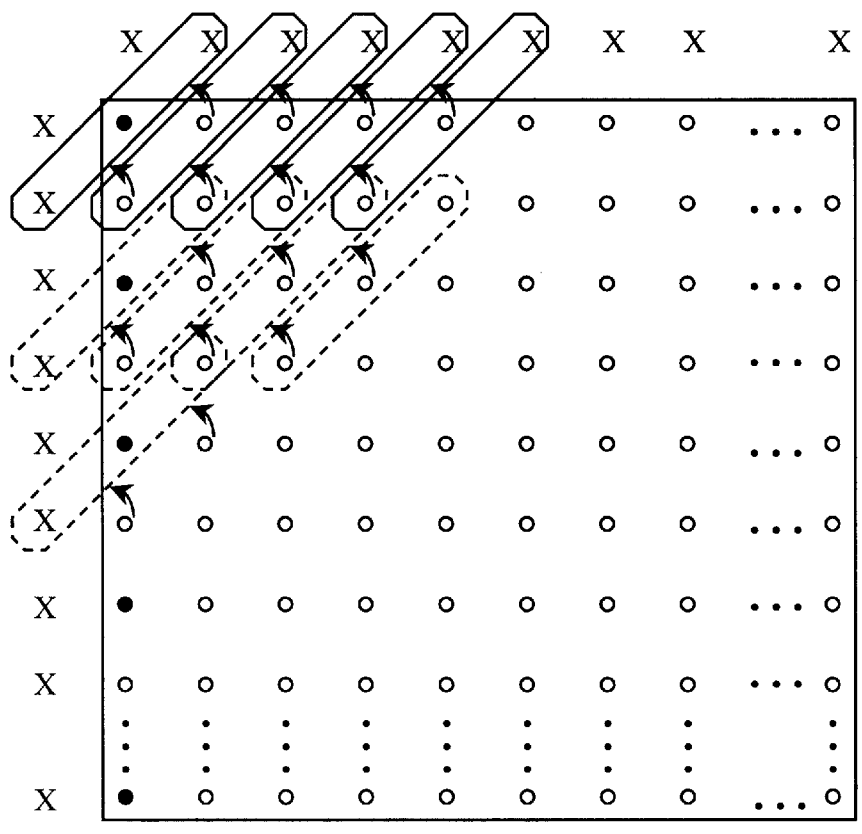
FIG. 6B is a block diagram illustrating the manner in which an entire coefficient matrix is processed by the differential 2-D quantizer according to one embodiment of the invention.

FIG. 6B is a block diagram illustrating the manner in which an entire coefficient matrix is processed by the differential 2-D quantizer according to one embodiment of the invention. The rows of the coefficient matrix are processed in pairs. The first coefficient for each pair of rows (more exactly coefficients $w_{1,1}, w_{3,1}, w_{5,1}, \ldots w_{M-1,1}$) is scalar quantized to form a quantized reference coefficient vector, encoded using a variable length encoder, and put into bit stream. Using the first coefficient for each pair of rows, each pair of rows is processed from left to right, where the quantized values of estimation errors $q(E_{i,1})$, $q(E_{i,2})$ for a given pair of rows are generated simultaneously. The values outside matrix W are assumed to be equal to a prescribed value, for example, they can be assumed to be equal to zero. The resulting quantized estimation error matrix is passed to the encoder unit 130 as the quantized coefficient matrix.

Figure 7:
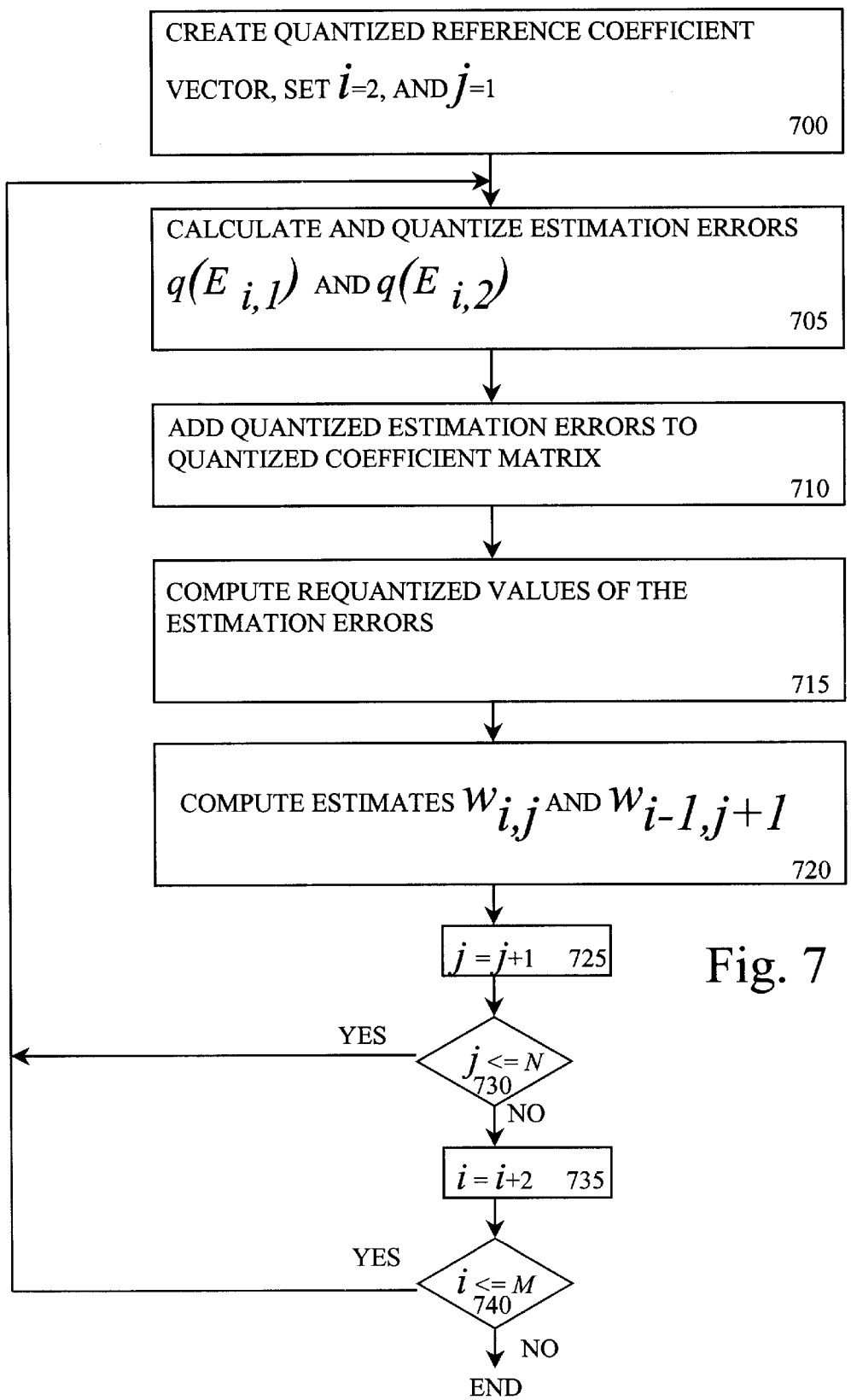
FIG. 7 is a flow diagram illustrating the high correlation quantization unit from FIG. 1 in more detail according to one embodiment of the invention.

FIG. 7 is a flow diagram illustrating the high correlation quantization unit from FIG. 1 in more detail according to one embodiment of the invention. In step 700, the quantized reference coefficient vector is generated, a variable i is set to 2, and a variable j is set to 1. From step 700 control passes to step 705. As shown in step 705, the quantized estimation errors are generated and control passes to step 710. In step 710, the quantized estimation errors generated in step 705 are added to the quantized coefficient matrix and control passes to step 715. In step 715, the requantized values of the estimation errors are generated and control passes to step 720. In step 720, the estimates for $w_{i,j}$ and $w_{i-1,j+1}$ are generated. From step 720, control passes to step 725. In steps 725, j is incremented by 1 and control passes to step 730. In step 730, it is determined if j<=N. If j<=N, control passes back to step 705. Otherwise, control passes to step 735. In step 735, i is incremented by 1 and control passes to step 740. In step 740, it is determined if i<=M. If i<=M, control passes back to step 705. Otherwise, the flow diagram ends.

While one embodiment of the invention is described in which the quantizer to be used for at least certain of the coefficient matrices provided by the decomposition unit is dynamically selected, alternative embodiments of the invention utilize an embodiment of the differential 2-D quantizer for all or a predefined set of the coefficient matrices.

Low Correlation Matrix Quantization

While a number of different quantization techniques could be performed by the low correlation quantization unit 125, one embodiment of the invention utilizes a hierarchical scalar quantization technique. In general, the hierarchical scalar quantizer recursively and hierarchically divides the coefficient matrix into sub-matrices to locate "low energy" sub-matrices. These low energy sub-matrices are replaced with zero matrices of the same size. In contrast, the high energy sub-matrices are quantized using a conventional uniform scalar quantizer with a quantization step size dependent on the entire coefficient matrix energy. Thus, the low correlation quantization unit 125 generates a quantized coefficient matrix and a quantization step size, and provides them to the encoder unit 130. By way of example, FIG. 4 illustrates that the HH subband matrix is hierarchically divided into three sub-matrices, of which two are replaced with zero sub-matrices and one is quantized.

Figure 8:
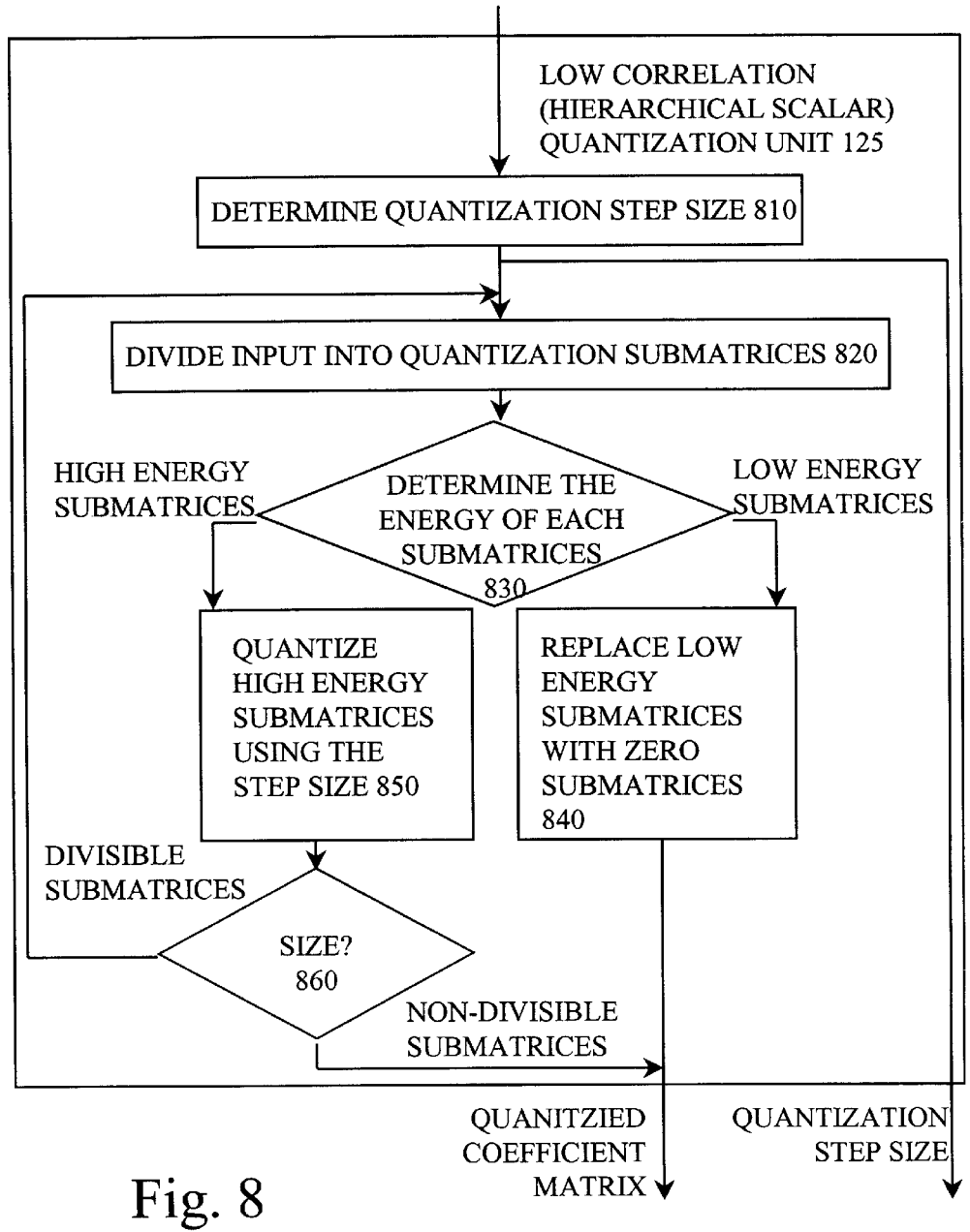
FIG. 8 is a data flow diagram illustrating the low correlation quantization unit from FIG. 1 in more detail according to one embodiment of the invention.

In FIG. 8, the input coefficient matrix is analyzed to determine a quantization step size (block 810). In one embodiment of the invention, the quantization step size is a function of the coefficient matrix energy. Exemplary techniques for performing block 810 can be found in Strand, Gilbert, and Nguyen, Truong, *Wavelets and Filter Banks*, Wellesley-Cambridge Press, 1996, p. 370.

In addition to determining the quantization step size, the input coefficient matrix is divided into quantization sub-matrices (block 820). As previously stated, the exemplary quantized coefficient matrix for the HH subband in FIG. 4 has been divided.

Following step 820, the energy of each of the sub-matrices is then determined (830). Step 830 can be performed in the same manner as block 510 of FIG. 5. Those sub-matrices that contain a sufficiently low energy level are replaced with zero sub-matrices of the same size (840). In contrast, those sub-matrices which cannot be replaced with zero sub-matrices are quantized using the determined quantization step size (850).

Following block 850, the size of those sub-matrices which are quantized is checked to determine whether the sub-matrices can be further divided (860). If the quantized sub-matrices cannot be divided, the quantized sub-matrix is located in the appropriate place of the output quantized coefficient matrix. However, if the quantized sub-matrix can be further divided, control passes back to block 820 and the process is repeated for that sub-matrix. In one embodiment of the invention, a sub-matrix having a size greater than k×l can be further divided.

Hierarchical Encoder Selection

Having described certain aspects of the invention regarding quantization, other aspects of the invention regarding encoding will now be described. Referring to the embodiment illustrated in FIG. 1, depending on the quantization mode selected for a given matrix, the encoder unit receives either: 1) the quantized coefficient matrix of estimation errors and the quantized reference coefficient vector; or 2) the quantized coefficient matrix and the quantization step size. Of course, different embodiments using different quantization modes would provide different data to the encoder unit 130. While any number of different quantization modes providing different types of data to the encoder unit 130 can be used, the encoder unit will be described with reference to the quantization techniques previously disclosed to ease the understanding of the encoding aspects of the invention. This being the case, the quantized reference coefficient vector or the quantized step size provided to the encoder unit can be encoded using any number of techniques, including those in the art. However, the quantized coefficient matrices provided by both of the quantizers are encoded using one or more of the various techniques described in the following.

In general, the described hierarchical encoder selection unit 135 utilizes two separate techniques: 1) dynamically selecting between various encoding techniques for matrices based on the density of those matrices; and 2) hierarchically dividing matrices until the resulting sub-matrices meet the selection criteria for one of the encoding techniques or reach a sufficiently small size. However, while one embodiment of the invention is described in which the encoding technique is always dynamically selected, alternative embodiments of the invention could always use the same encoding techniques for certain of the quantized coefficient matrices (e.g., always use the same encoding technique for the quantized coefficient matrix from the high correlation quantizer, while dynamically selecting the encoding technique for the quantized coefficient matrix from the low correlation quantizer; and/or always using the same encoding technique for certain frequency subbands, while dynamically selecting the encoding technique for others of the frequency subbands). Furthermore, alternative embodiments can be implemented to split the quantized coefficient matrices into sub-matrices in a non-hierarchical manner and/or a pre-determined manner (e.g., always dividing the quantized coefficient matrices into a pre-determined number of sub-matrices, and encoding the sub-matrices accordingly).

Figure 9:
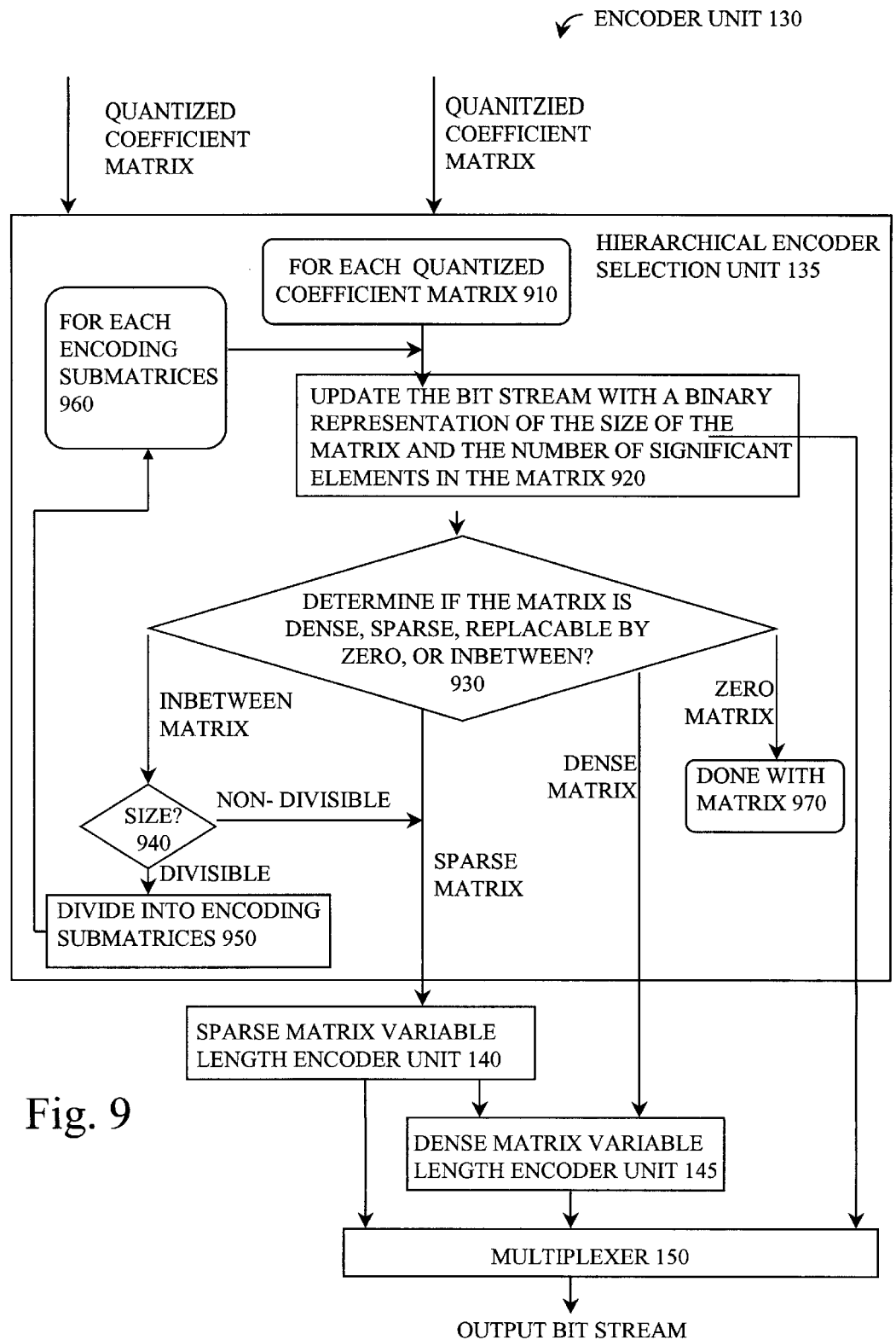
FIG. 9 is a block diagram illustrating the hierarchical encoder selection unit 135 of FIG. 1 in more detail according to one embodiment of the invention.

FIG. 9 is a block diagram illustrating the hierarchical encoder selection unit 135 of FIG. 1 in more detail according to one embodiment of the invention. In particular, FIG. 9 illustrates the recursive operations performed for each quantized coefficient matrix received by the hierarchical encoder selection unit 135 (910). For a given quantized coefficient matrix, the bit stream is updated with a binary representation of the size of the matrix and the number of significant elements in the matrix (920). While in the illustrated embodiment the size of each matrix is transmitted, an alternative embodiment only transmits the original image size (the matrix sizes are determined during decomposition from the original image size, number of decomposition steps and splitting coefficient).

In addition, it is determined whether the quantized coefficient matrix is dense, sparse, replaceable by zero, or "in-between" (930). In one embodiment of the invention, each matrix is classified based on the number of significant coefficients in relation to the size of the matrix (number of non-zero coefficients/(M×N)). While certain embodiments consider any non-zero coefficient to be significant, alternative embodiments can use a different threshold.

In one embodiment, a matrix is considered replaceable by a zero matrix if the matrix contains no significant coefficients. For those matrices that are deemed to be replaceable by zero, no additional processing is required (970).

In contrast, if the number of significant coefficients in relation to the size of the matrix indicate that the matrix is sufficiently sparse, then the sparse matrix variable length encoder unit 140 is used. Similarly, if the relationship of the number of significant coefficients and the size of the matrix indicates the matrix is sufficiently dense (beyond a threshold), the matrix is identified as dense and provided to the dense matrix variable length encoder unit 145. In one embodiment of the invention, a dense matrix is one having a one-dimensional entropy greater than one bit/symbol.

Finally, if the relationship of the number of significant elements to the size of the matrix indicates the matrix is not replaceable by zero, sufficiently dense, or sufficiently sparse, the matrix is classified as an in-between matrix and a determination as to whether that matrix is divisible is made (940). If an in-between matrix is determined to be non-divisible, that in-between matrix is provided to the sparse matrix variable length encoder unit 140. In contrast, if a matrix classified as an in-between matrix can be further divided, then the matrix is divided into encoding sub-matrices (950). For those matrices that are divided into encoding sub-matrices, the same operations are recursively performed (960). While the illustrated embodiment shows that when a submatrices reaches a certain size it is designated non-divisible (see step 940), alternative embodiments divide submatrices until they are 1×1.

Figure 10:
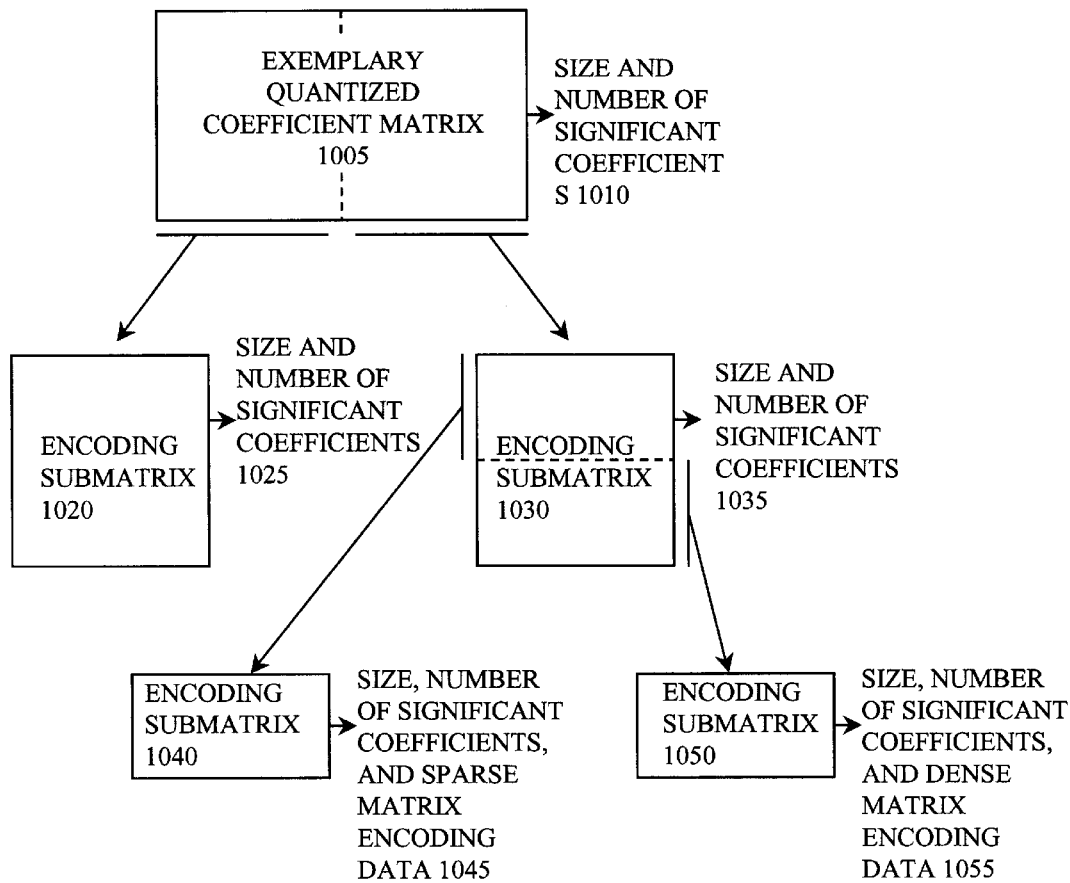
FIG. 10 is a conceptual block diagram illustrating an exemplary hierarchical encoding of an exemplary quantized coefficient matrix according to one embodiment of the invention.

FIG. 10 is a conceptual block diagram illustrating an exemplary hierarchical encoding of an exemplary quantized coefficient matrix according to one embodiment of the invention. With reference to FIGS. 9 and 10, the size and number of significant coefficients 1010 in the exemplary quantized coefficient matrix 1005 are inserted into the bit stream as part of step 920. Next, the exemplary quantized coefficient matrix 1005 is determined to be an in-between matrix that is divisible (steps 930 and 940). As a result, the quantized coefficient matrix 1005 is divided into an encoding sub-matrix 1020 and an encoding sub-matrix 1030 (step 950). Returning to step 920, the size and number of significant coefficients for both the encoding submatrices 1020 and 1030 are inserted into the bit stream (see the data labeled 1025 and 1035 in FIG. 10).

While the encoding sub-matrix 1020 is deemed to be replaceable by a zero matrix, the encoding sub-matrix 1030 is determined to be an in-between matrix. As such, the encoding sub-matrix 1030 is further divided into an encoding sub-matrix 1040 and an encoding sub-matrix 1050. As illustrated in FIG. 10, the encoding sub-matrix 1040 was either: 1) determined to be an in-between matrix and non-divisible; or 2) determined to be a sparse matrix. As such, the size, number of significant coefficients, and sparse matrix encoding data (generated by the sparse matrix variable length encoder unit 140) are inserted into the bit stream. In contrast, the encoding sub-matrix 1050 was determined to be a dense matrix. As such, the size, number of significant coefficients, and dense matrix encoding data (generated by the dense matrix variable length encoder unit 145) are inserted into the bit stream for the encoding sub-matrix 1050.

While FIG. 10 illustrates a manner in which the quantized coefficient matrices can be divided (divided in half, alternating the division between height and width), alternative embodiments can divide the matrices any number of ways (e.g., divide the matrices into fourths, always divide by height or width, etc.).

Sparse Matrix Encoding

Figure 11:
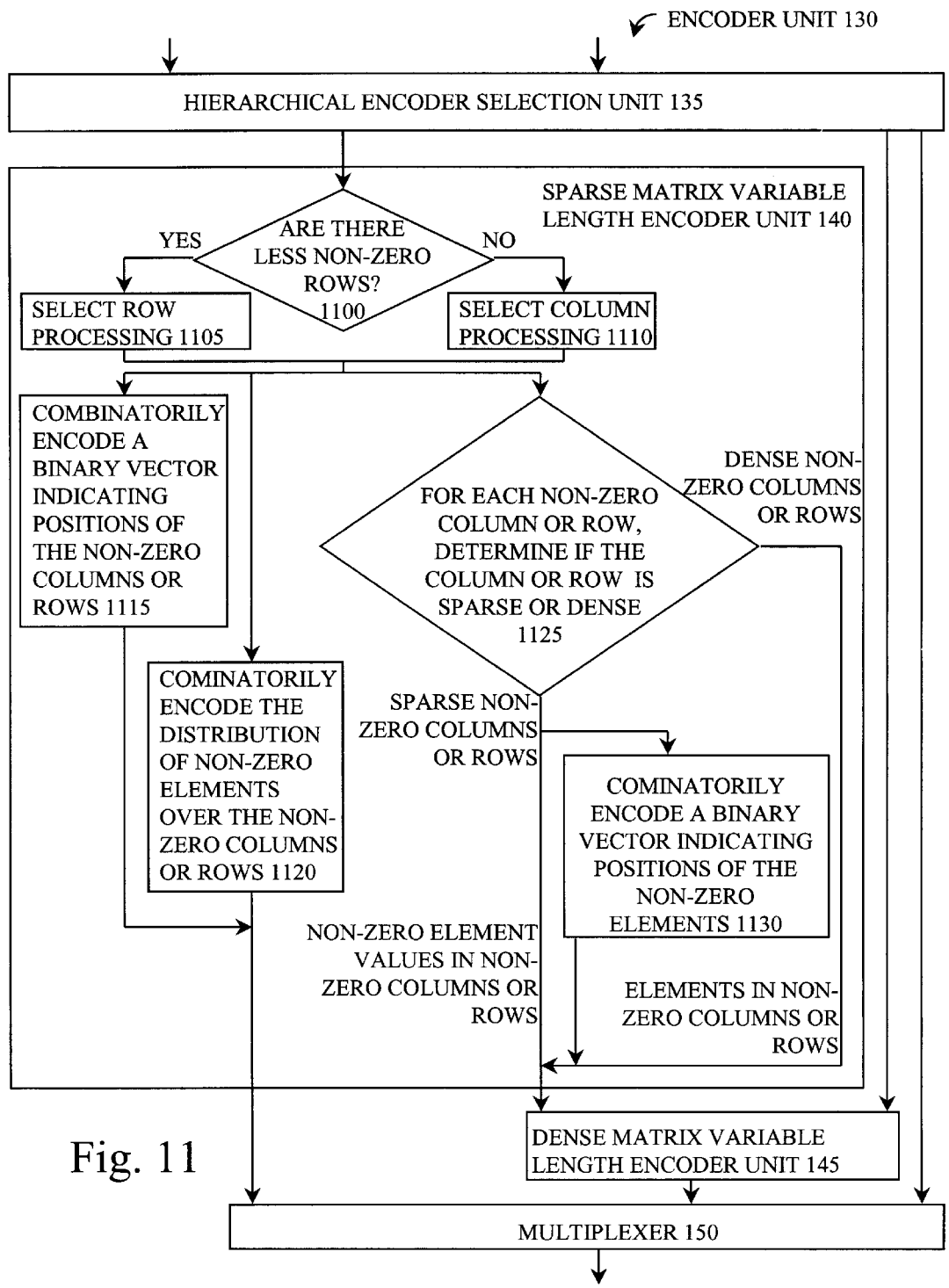
FIG. 11 is a block diagram illustrating additional detail concerning the sparse matrix variable length encoder unit of FIG. 1 according to one embodiment of the invention.

FIG. 11 is a block diagram illustrating additional detail concerning the sparse matrix variable length encoder unit of FIG. 1 according to one embodiment of the invention. While several implementations of the sparse matrix variable length encoder unit 140 are described below, any number of different encoders which achieve a high compression ratio for sparse matrices can be used.

For each sparse matrix provided to the sparse matrix variable length encoder unit 140, it is determined whether there are less non-zero rows than there are columns (1100). If there are less non-zero rows than columns, the sparse matrix variable length encoder processes the sparse matrix by rows (1105). Otherwise, the sparse matrix variable length encoder processes the sparse matrix by columns (1110). While one embodiment is described in which either rows or columns are dynamically selected as a processing orientation for the sparse matrix variable length encoder, alternative embodiments could use a different technique (e.g., always select rows or columns, alternatively select between rows and columns, etc.).

Figure 12:
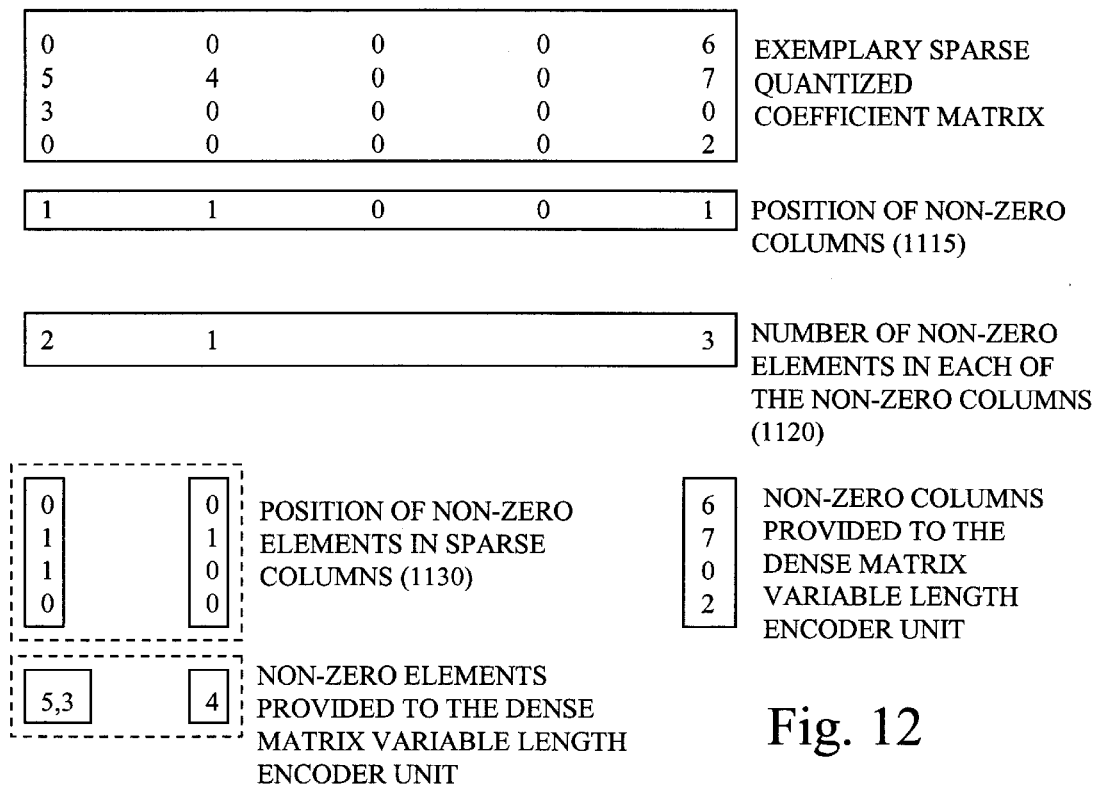
FIG. 12 illustrates the results of processing an exemplary sparse quantized coefficient matrix received by the sparse matrix variable length encoder unit 140.

Once the processing orientation of the sparse matrix has been determined, a binary "position" vector indicating the positions of the non-zero columns (rows) in the sparse matrix is combinatorially encoded and inserted into the bit stream (1115). In one embodiment, the binary position vector contains a bit for each column (row) that is set to one or zero respectively based on whether the column (row) contains a non-zero element or not. By way of example, FIG. 12 is a block diagram illustrating an exemplary encoding of an exemplary sparse quantized coefficient matrix. In particular, FIG. 12 illustrates the exemplary sparse quantized coefficient matrix received by the sparse matrix variable length encoder unit 140. While the embodiment illustrated in FIG. 11 is capable of selecting either columns or rows, the example illustrated in FIG. 12 is processed by columns. With reference to FIG. 12, a binary position vector indicating the position of the non-zero columns is shown.

In addition to the binary position vector, the distribution of the non-zero elements over the non-zero columns (rows) is also combinatorially encoded and inserted into the bit stream (1120). In one embodiment of the invention, the distribution of non-zero elements over the non-zero columns (rows) is identified using a binary "distribution" vector with ones on positions with numbers equal to the column (row) non-zero element number. With reference to FIG. 12, a binary distribution vector indicating the number of non-zero coefficients per non-zero columns is shown.

In addition to the combinatorially encoded position and distribution vectors, each non-zero column (row) is classified as either sparse or dense (1125). In one embodiment of the invention, a column (row) is determined to sparse or dense based on the number of significant elements which it contains. While one embodiment bases whether a column (row) is sparse or dense based merely on the number of non-zero elements, alternative embodiments could use any number of techniques. For example, an alternative embodiment could determine whether a column (row) is sparse or dense based on the number of significant elements relative to the total number of elements in that column.

If a column (row) is determined to be dense, then the elements making up the non-zero column (row) are provided to the dense matrix variable length encoder unit 145. With reference to FIG. 12, the elements of a non-zero column are illustrated as being provided to the dense matrix variable length encoder unit.

In contrast, if a non-zero column (row) is determined to be sparse, then: 1) a binary vector indicating the positions of the non-zero elements in the column (row) is combinatorially encoded and inserted into the bit stream; and 2) the values of the non-zero elements in the non-zero column (row) are provided to the dense matrix variable length encoder unit 145. With reference to FIG. 12, binary vectors indicating the positions of the non-zero elements in the sparse columns are shown. In addition, the non-zero elements from the sparse columns are illustrated in FIG. 12 as being provided to the dense matrix variable length encoder unit 145.

While one embodiment is described in which the sparse matrix variable length encoder unit is used for only sparse matrices, alternative embodiments could use the techniques of the sparse matrix variable length encoder unit 140 for any number of different inputs (e.g., the sparse matrix variable length encoding could be performed on all quantized coefficient matrices). While one embodiment is described in which combinatorially encoding is used, alternative embodiments could use other encoding techniques.

Dense Matrix Encoding

Any number of encoders suitable for encoding dense matrices can be implemented in the dense matrix variable length encoder unit 145. In one embodiment of the invention, a Huffman encoder is used.

DECOMPRESSION

As is well known in the art, the type of compression technique used dictates the type of decompression that must be performed. In addition, it is appreciated that since decompression generally performs inverse operations performed in compression, for every alternative compression technique described, there is a corresponding decompression technique. As such, while techniques for decompressing video data which was compressed using the system disclosed with reference to FIG. 1, it is appreciated that decompression techniques can be modified to match the various alternative embodiments described with reference to the compression techniques.

Figure 13:
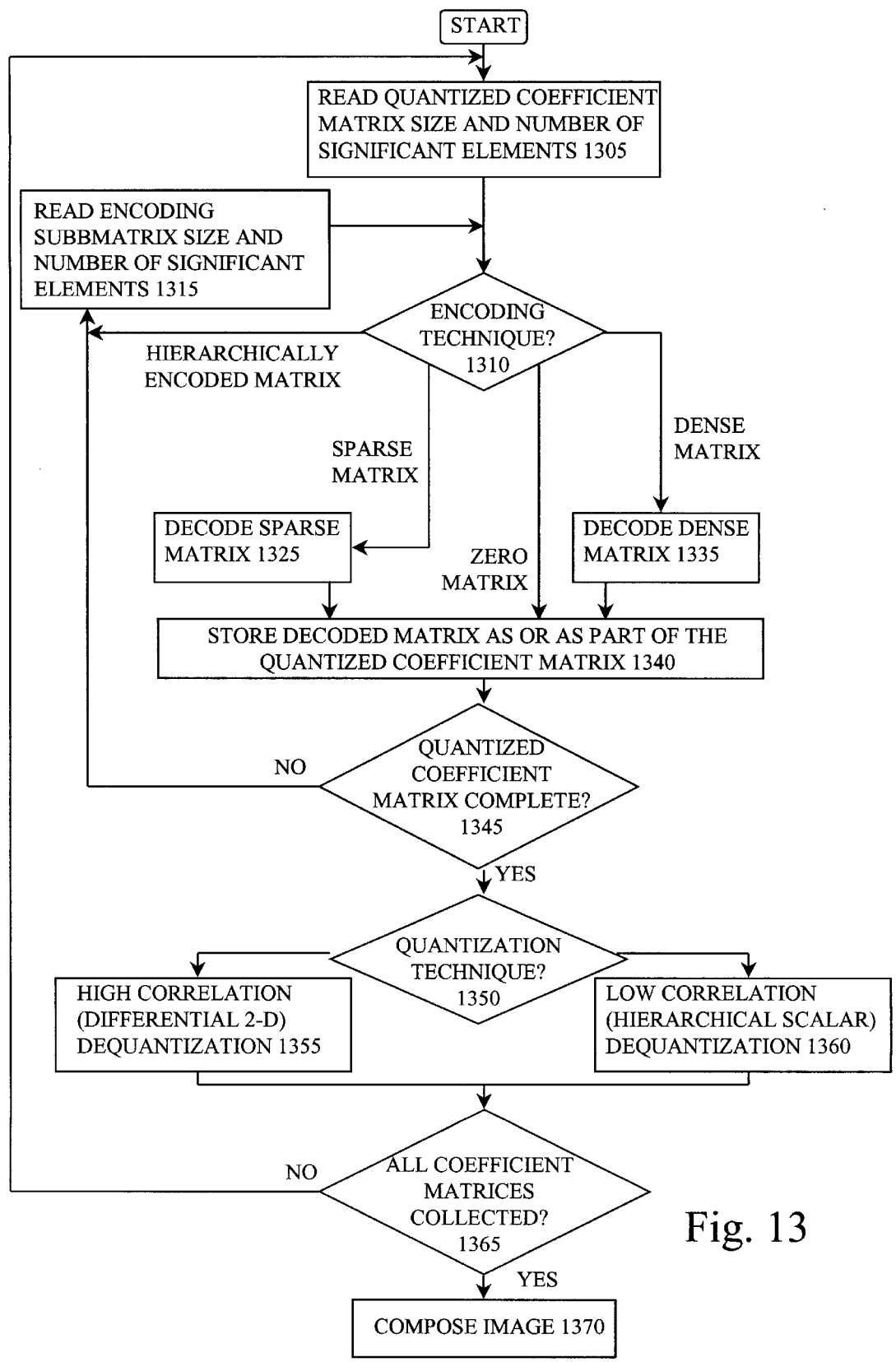
FIG. 13 is a data flow diagram illustrating the decompression of video data compressed using the system disclosed in FIG. 1 according to one embodiment of the invention.

FIG. 13 is a data flow diagram illustrating the decompression of video data compressed using the system disclosed in FIG. 1 according to one embodiment of the invention. At step 1305, the size and number of significant elements for a quantized coefficient matrix is read from the bit stream. By way of example with reference to FIG. 10, the size and number of significant coefficients for the exemplary quantized coefficient matrix 1005 would be received. From step 1305, control passes to step 1310.

As shown in step 1310, the technique used for coding used during compression of the matrix currently being decompressed (the quantized coefficient matrix or some encoding sub-matrix) is determined. In one embodiment of the invention, step 1310 is performed in the same manner in which the compression system determined how to code matrices (the relationship between the number of significant elements and the size of the matrix). While one embodiment is described in which the coding technique used during compression is determined based on the size of the matrix/sub-matrix and the number of non-zero elements, alternative embodiments could use different techniques (e.g., determine the coding based on additional bits inserted into the bit stream by an alternative compression system; determine the coding technique based on the quantization technique or subband in a compression system that uses predetermined quantizers and/or coders; etc.). If it is determined that the quantized coefficient matrix was hierarchically encoded, then control passes to step 1315. With reference to FIG. 10, the exemplary quantized coefficient matrix 1005 was divided into sub-matrices.

As shown in step 1315, the size and number of non-zero elements for one of the encoded sub-matrices is read from the bit stream and control passes back to step 1310. By way of example in FIG. 10, the size and number of significant coefficients for the encoding sub-matrix 1020 or the encoding sub-matrix 1030 would be read depending on the order in which those encoding sub-matrices were inserted into the bit stream.

If it is determined in step 1310 that the matrix currently being processed was encoded as a sparse matrix, then that matrix is decoded in step 1325. Similarly, if the matrix currently being processed is determined to have been encoded as a dense matrix, then control passes from step 1310 to step 1335 where the dense matrix is decoded. Control passes from both steps 1325 and 1335 to step 1340. Since in the described embodiment matrices classified as zero matrices are encoded using only the size and number of significant coefficients, control passes from step 1310 to step 1340 when it is determined that the zero matrix encoding technique was used.

In step 1340, the decoded data for the matrix currently being processed is stored as the quantized coefficient matrix currently being processed or as part of the quantized coefficient matrix currently being processed. In this manner, the various sub-matrices of those quantized coefficient matrices which were divided into sub-matrices are collected. From step 1340, control passes to step 1345.

In step 1345, it is determined whether the quantized coefficient matrix currently being processed is complete. If the quantized coefficient matrix currently being processed is not complete, control passes back to step 1315. Otherwise, control passes to step 1350.

In step 1350, the quantization technique used to quantize the coefficient matrix currently being process is determined. In the embodiment described with reference to FIG. 1 in which a zero or one was inserted into the bit stream to indicate which of the two quantization techniques were selected, this bit is read to perform step 1350. Of course, alternative embodiments could use different techniques for indicating which quantization mode was used. If it is determined that the high correlation quantizer was used, then control passes to step 1355 in which high correlation de-quantization is performed. Otherwise, control passes to step 1360 where low correlation de-quantization is performed. Control passes from both steps 1355 and 1360 to step 1365.

As shown in step 1365, it is determined whether all of the coefficient matrices for the image which was compressed have been collected. If all of the coefficient matrices have not been collected, control passes back to step 1305 and the decompression of the next quantized coefficient matrix is begun. Otherwise, control passes to step 1370 where the image is composed by performing the inverse of the digital filters performed during compression. The resulting composed image is then output.

EXEMPLARY SYSTEM

The compression technique described herein can be used for still images or motion video. In addition, the compression technique can be used on multiple frame images as described in the application entitled "Multiple Frame Image Compression and Decompression of Motion Video," filed Dec. 3, 1997, and having Ser. No. 08/984,450. When using the multiple frame image technique, multiple frames of a motion video sequence are grouped to form a multiple frame image that is compressed as a single image (or super frame). In addition, the frames in the multiple frame image are oriented such that each frame boundary that lies within the multiple frame image is adjacent to the same boundary of another frame.

While in one embodiment all of the frames of motion video are compressed using the described technique, alternative embodiments can use different compression techniques for multiple frame images and/or for selected individual frames. For example, one alternative embodiment uses a combination of: 1) subband decomposition using wavelets on selected multiple frame images formed with non-sequential frames; and 2) interframe compression (e.g., motion estimation) on the remaining frames. As another example, one alternative embodiment uses a combination of: 1) pixel compression on the first frame; 2) interframe compression on the next three frames; 3) subband decomposition using wavelets on selected multiple frame images; and 4) interframe compression on the remaining frames. Thus, the compression technique described herein can be used in any number of different compression schemes that use any combination of different compression techniques.

Figure 14:
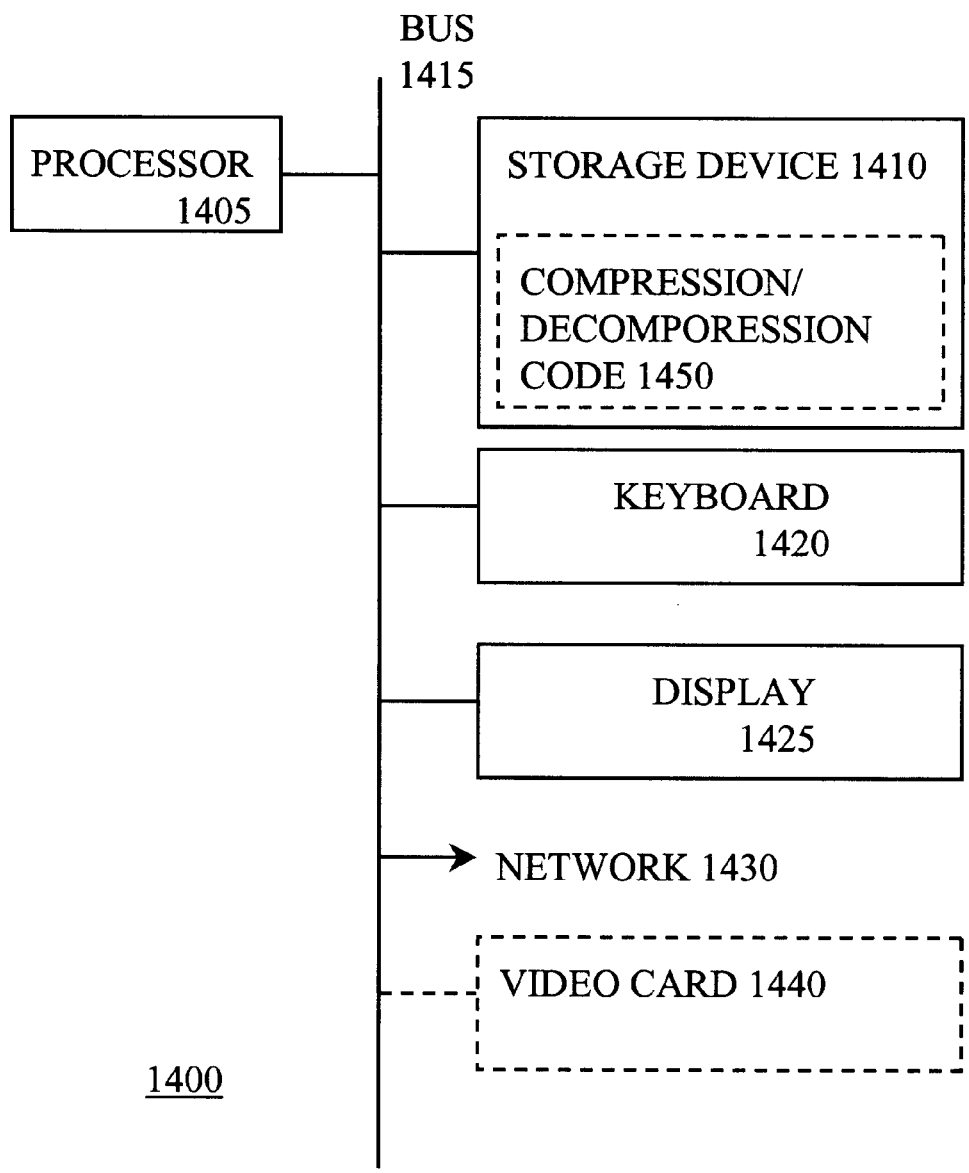
FIG. 14 is a block diagram illustrating an exemplary computer system 1400 in which various embodiments of the invention can be implemented.

FIG. 14 is a block diagram illustrating an exemplary computer system 1400 in which various embodiments of the invention can be implemented. The exemplary computer system 1400 includes a processor 1405 coupled to a storage device 1410 by a bus 1415. In addition, a number of user input/output devices, such as a keyboard 1420 and a display 1425, may also be coupled to the bus 1415. Also, a network 1430 may also be coupled to the bus 1415 to communicate information (e.g., carrier waves). The processor 1405 represents a central processing unit of any type architecture (e.g., CISC, RISC, VLIW, or hybrid architecture). The bus 1415 represents one or more buses (e.g., PCI, ISA, X-Bus, EISA, VESA, etc.) and bridges (also termed as bus controllers). The storage device 1410 represents one or more machine-readable media for storing data (e.g., random access memory, read only memory, magnetic disk, optical disk, etc.). While a single processor computer system is illustrated, the invention can be implemented in a multi-processor computer system.

Different embodiments of the invention can implement the different units illustrated in the various figures using various combinations of hardware, firmware, and/or software. For example, a video card containing dedicated hardware/firmware/software could be connected via a bus in a standard PC configuration (e.g., video card 1440 in FIG. 14). Alternatively, dedicated hardware/firmware/software could be connected to a standard PC configuration via one of the standard ports (e.g., the parallel port). In yet another alternative embodiment, the main memory (including caches) and host processor(s) of a standard computer system could be used to implement the operations required (e.g., compression/decompression code 1450 shown stored in the storage device 1410 of the computer system 1400). In yet other alternative embodiments of the invention, different aspects of the invention could be implemented in different areas of the computer system (e.g., decompression could be performed by executing code stored in a storage device 1410 on the host processor(s), while compression is performed by the video card 1440; compression processing could be divided between code executing on the host processor(s) and the video card 1440; etc.)

Thus, it is understood by one of ordinary skill in the art that various combinations of hardware, firmware, and/or software can be used to implement the various aspects of the invention. Where software is used to implement all or part of the invention, the sequence of instructions can be stored on a "machine readable medium," such as a read-only memory (ROM), random access memory (RAM), magnetic disk storage media, optical storage media, flash memory devices, carrier waves received over a network, etc.

ALTERNATIVE EMBODIMENTS

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer-implemented method of compressing image data comprising:

recursively filtering an image into its constituent components each represented by a matrix of coefficients;

determining a level of correlation of a first matrix coefficients;

selecting one of a first quantization technique and a second quantization technique as a selected quantization technique based on the level of correlation;

quantizing the first matrix of coefficients using the selected quantization technique to generate a first quantized matrix of coefficients;

upon selection of the second quantization technique, dividing the first quantized matrix until the first quantized matrix or each submatrices is sufficiently dense, sufficiently sparse or sufficiently small;

determining a number of significant elements in the first quantized matrix of coefficients;

selecting one of a plurality of coding techniques based on the number of significant elements; and coding the first quantized matrix of coefficients using the selected coding technique.

2. A computer-implemented method of compressing image data comprising:

recursively filtering an image into its constituent components each represented by a matrix of coefficients;

determining a level of correlation of a first matrix coefficients;

selecting one of a first quantization technique and a second quantization technique as a selected quantzation technique based on the level of correlation;

quantizing the first matrix of coefficients using the selected quantization technique to generate a first quantized matrix of coefficients;

upon selection of the second quantization technique, dividing the first quantized matrix until the first quantized matrix or each submatrices is sufficiently dense, sufficiently sparse or sufficiently small;

encoding sufficiently dense matrices using a first technique;

encoding sufficiently sparse matrices using a second technique;

during said dividing another condition under which the first quantized matrix or a submatrices is not further divided is when that matrix is representable by a zero matrix; and said method includes encoding matrices, representable by zero as zero matrices.

3. A method for compressing image data comprising:

recursively filtering an image into at least a first and second matrix of coefficients;

quantizing the first and second madix of coefficients using different quantization techniques;

determining a number of significant elements in the first quantized matrix of coefficients;

selecting one of a plurality of coding techniques based on the number of significant elements;

coding the fist quantized matrix of coefficients using the selected coding technique; and coding the second quantized matrix of coefficients.

4. The method of claim 3, further comprising:

determining a level of correlation for each of the first and second matrix of coefficients;

selecting differential quantization for the first matrix of coefficients based on the level of correlation determined for the first matrix of coefficients; and selecting hierarchical quantization for the second matrix of coefficients based on the level of correlation determined for the second matrix of coefficients.

5. The method of claim 3, wherein recursively filtering includes performing one or more wavelet decompositions.

6. The method of claim 5, wherein the first matrix of coefficients is a lower frequency component than said second matrix of coefficients.

7. The method of claim 3, wherein quantizing the first and second matrix of coefficients using different quantization techniques includes:

differentially quantizing the first matrix of coefficients; and hierarchically quantizing the second matrix of coefficients.

8. The method of claim 7, wherein differentially quantizing includes:

performing a two dimensional differential quantization.

9. The method of claim 7, wherein hierarchically quantizing includes:

dividing the second matrix of coefficients into submatrices until each submatrix can either be replaced by a zero submatrix or is sufficiently small;

replacing all submatrices that can be replaced by zero submatrices; and quantizing all submatrices that are not replaceable by zero submatrices.

10. The method of claim 7, wherein:

the method further includes determining a quantization step size; and quantizing all submatrices that are not replaceable by zero submatrices is performed using the quantization step size.

11. The method of claim 10, determining the quantization step size includes determining the quantization step size as a function of the energy represented in the second matrix of coefficients.

12. The method of claim 9, wherein dividing includes:

dividing the second matrix of coefficients into submatrices;

for each submatrix, performing:
    determining a energy level of the submatrix;
    if the energy level of the submatrix is sufficiently low, then determining the submatrix can be replaced; and
    if the energy level of the submatrix is not sufficiently low, then recursively dividing the submatrix into smaller submatrices until each submatrix can either be replaced or is of a sufficiently small size.

13. The method of claim 3, wherein said coding the first quantized matrix of coefficients further comprises:

dividing the first quantized matrix until the first quantized matrix or each submatrices is sufficiently dense, sufficiently sparse, or sufficiently small;

encoding sufficiently dense matrices using a first coding technique;

encoding sufficiently sparse matrices using a second coding technique.

14. The method of claim 13, wherein:

during said dividing another condition under which the first quantized matrix or a submatrices is not further divided is when that matrix is representable by a zero matrix; and said method includes encoding matrices, representable by zero as zero matrices.

15. The method of claim 13 wherein said encoding sufficiently dense matrices includes performing a huffman code.

16. The method of claim 13 wherein said encoding sufficiently sparse matrices includes performing combinatorial coding.

17. A computer-inmplemented method of compressing image data, said method comprising:

digitally filtering an image into its constituent components each represented by a matrix of coefficients;

quantizing at least certain coefficients of a first matrix to generate a first quantized matrix;

dividing the first quantized matrix until the first quantized matrix or each submatrices is sufficiently dense, sufficiently sparse, or sufficiently small;

encoding sufficiently dense matrices using a first technique;

encoding sufficiently sparse matrices using a second technique;

during said dividing another condition under which the first quantized matrix or a submatrices is not further divided is when that matrix is representable by a zero matrix; and said method includes encoding matrices, representable by zero as zero matrices.

18. A method of compressing a quantized matrix representing image data, said method comprising:

determining which of a plurality of sets of elements includes significant elements, wherein sets in the plurality of sets of elements are either rows or columns of the quantized matrix;

encoding how the significant elements are distributed over the plurality of sets of elements;

encoding values and positions of the significant elements in the plurality of sets of the elements that contain significant elements, wherein said encoding values and positions of the significant elements in the plurality of sets of elements include encoding positions and values of significant elements in a first and second of the plurality of sets of elements using different techniques based on the number of significant elements in the first and second sets.

19. The method of claim 18 further including preliminarily:

determining the number of columns and rows that contain significant elements;

selecting either the columns or rows to form the plurality of sets of elements based on how many columns and how many rows contain significant elements.

20. The method of claim 18, wherein said encoding which of the plurality of sets of elements containing significant elements includes:

generating a binary vector identifying the positions of either columns or rows that contain significant elements; and combinatorily encoding the binary vector.

21. The method of claim 18, wherein said encoding how the significant elements are distributed over the plurality of sets of elements includes:

generating a binary distribution vector with ones on positions with numbers equal to the significant element number of each set.

22. The method of claim 18, wherein said encoding data identifying values and positions includes:

encoding the positions and values of the significant elements in the plurality of sets of elements, separately.

23. The method of claim 22, wherein said encoding the values and positions of the significant elements in the plurality of sets of elements separately include:

generating a binary vector for a first of the plurality of sets of elements, said binary vector identifying positions of significant elements in the first set;

combinatorily encoding the binary vector.

24. The method of claim 18, wherein said encoding values and positions of the significant elements in the plurality of sets of elements include:

encoding positions and values of significant elements in a first and second of the plurality of sets of elements using different techniques based on the number of significant elements in the first and second sets.

* * * * *